US 10,903,008 B2

(12) United States Patent
Sakate et al.

(10) Patent No.: US 10,903,008 B2
(45) Date of Patent: Jan. 26, 2021

(54) MULTI-LAYER CERAMIC ELECTRONIC COMPONENT AND METHOD OF PRODUCING THE SAME

(71) Applicant: Taiyo Yuden Co., Ltd., Tokyo (JP)

(72) Inventors: Daisuke Sakate, Tokyo (JP); Kotaro Mizuno, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 10 days.

(21) Appl. No.: 16/270,230

(22) Filed: Feb. 7, 2019

(65) Prior Publication Data

US 2019/0252120 A1  Aug. 15, 2019

(30) Foreign Application Priority Data

Feb. 9, 2018  (JP) .................................. 2018-021758

(51) Int. Cl.
| | | |
|---|---|---|
| *H01G 4/224* | (2006.01) | |
| *H01G 4/30* | (2006.01) | |
| *H01G 4/12* | (2006.01) | |
| *B32B 37/02* | (2006.01) | |
| *H01G 4/008* | (2006.01) | |
| *B32B 37/10* | (2006.01) | |
| *B32B 38/18* | (2006.01) | |

(52) U.S. Cl.
CPC ............ *H01G 4/224* (2013.01); *B32B 37/02* (2013.01); *B32B 37/10* (2013.01); *B32B 38/1808* (2013.01); *H01G 4/008* (2013.01); *H01G 4/12* (2013.01); *H01G 4/30* (2013.01); *B32B 2307/202* (2013.01); *B32B 2307/204* (2013.01); *B32B 2307/206* (2013.01); *B32B 2315/02* (2013.01); *B32B 2457/16* (2013.01)

(58) Field of Classification Search
CPC ................................. H01G 4/30; H01G 4/224
See application file for complete search history.

(56) References Cited

U.S. PATENT DOCUMENTS

| | | |
|---|---|---|
| 2012/0234462 A1 | 9/2012 | Matsui et al. |
| 2013/0340920 A1 | 12/2013 | Matsui et al. |
| 2014/0185185 A1 | 7/2014 | Okajima et al. |
| 2014/0345779 A1 | 11/2014 | Matsui et al. |

FOREIGN PATENT DOCUMENTS

| | | | |
|---|---|---|---|
| JP | 2007169087 A | * | 7/2007 |
| JP | 2010050263 A | * | 3/2010 |
| JP | 2012174916 A | * | 9/2012 |
| JP | 2012-209539 A | | 10/2012 |
| JP | 2014-143392 A | | 8/2014 |

* cited by examiner

*Primary Examiner* — Eric W Thomas
(74) *Attorney, Agent, or Firm* — Saliwanchik, Lloyd & Eisenschenk

(57) ABSTRACT

A multi-layer ceramic electronic component includes a multi-layer unit and a side margin. The multi-layer unit includes a capacitance forming unit, a cover, and a side surface. The capacitance forming unit includes ceramic layers that are laminated in a first direction and contain boron, and internal electrodes disposed between the ceramic layers. The cover covers the capacitance forming unit in the first direction. The side surface faces in a second direction orthogonal to the first direction. The side margin covers the side surface in the second direction and has a lower boron concentration than a boron concentration of the ceramic layers.

6 Claims, 12 Drawing Sheets

MULTI-LAYER CERAMIC ELECTRONIC COMPONENT AND METHOD OF PRODUCING THE SAME

CROSS-REFERENCE TO RELATED APPLICATION

This application claims the benefit under 35 U.S.C. § 119 of Japanese Application No. 2018-021758, filed Feb. 9, 2018, which is hereby incorporated by reference in its entirety.

BACKGROUND

The present disclosure relates to a multi-layer ceramic electronic component including side margins provided in a later step, and to a method of producing the multi-layer ceramic electronic component.

Representative multi-layer ceramic electronic components include multi-layer ceramic capacitors. In recent years, along with miniaturization of electronic devices and achievement of high performance thereof, there have been increasingly strong demands for increase in capacitance or the like with respect to the multi-layer ceramic capacitors.

Japanese Patent Application Laid-open No. 2012-209539 discloses a technique of providing, in a later step, side margins for ensuring insulation properties of the periphery of internal electrodes to a multi-layer chip including internal electrodes exposed at the side surfaces thereof. This technique enables the side margins to be thinned, which makes it possible to ensure a large intersectional area of the internal electrodes and contribute to increase in capacitance of the multi-layer ceramic capacitor.

Meanwhile, at the sintering of a ceramic body, a ceramic layer disposed at a portion close to the surface of the ceramic body, i.e., a superficial portion, is likely to be over-sintered (see Japanese Patent Application Laid-open No. 2014-143392). When over-sintering occurs, the internal electrodes are spheroidized or segmented, which results in the occurrence of a short circuit or reduction in insulation properties.

SUMMARY

It is known that adding boron (B) to the ceramic layer provides an effect of promoting densification of a ceramic layer (i.e., lowering sintering temperature). However, there is also a disadvantage that the internal electrodes are easily promoted to be spheroidized or segmented by over-sintering as described above.

In view of the circumstances as described above, it is desirable to provide a multi-layer ceramic electronic component including a dense ceramic layer, in which over-sintering is suppressed, and a method of producing a multi-layer ceramic electronic component.

According to an embodiment of the present disclosure, there is provided a multi-layer ceramic electronic component including a multi-layer unit and a side margin.

The multi-layer unit includes a capacitance forming unit, a cover, and a side surface. The capacitance forming unit includes ceramic layers that are laminated in a first direction and contain boron, and internal electrodes disposed between the ceramic layers. The cover covers the capacitance forming unit in the first direction. The side surface faces in a second direction orthogonal to the first direction.

The side margin covers the side surface in the second direction and has a lower boron concentration than a boron concentration of the ceramic layers.

With this configuration, it is possible to inhibit the vicinity of the end portions of the internal electrodes in the second direction from being spheroidized or segmented by over-sintering and also densify the ceramic layers disposed in the capacitance forming unit. This can reduce the occurrence of a short circuit failure or an insulation resistance (IR) failure between the internal electrodes of the multi-layer ceramic electronic component.

The capacitance forming unit may include a first region disposed at the center portion in the second direction, and a second region that is disposed between the first region and the side margin, the boron concentration of the ceramic layers in the second region being lower than the boron concentration of the ceramic layers in the first region and higher than the boron concentration of the side margin.

The ceramic layers disposed in the second region may have the boron concentration gradually decreasing from a side of the first region toward a side of the side margin.

With this configuration, a region in which over-sintering is to be suppressed can be limited particularly to a portion of a superficial portion, in which over-sintering is likely to occur. Further, with this configuration, a ceramic-densification-promoting effect of boron can be obtained also in the second region on the side of the first region.

According to another embodiment of the present disclosure, there is provided a method of producing a multi-layer ceramic electronic component, the method including: producing a multi-layer unit including a capacitance forming unit including ceramic layers that are laminated in a first direction and contain boron, and internal electrodes disposed between the ceramic layers, a cover that covers the capacitance forming unit in the first direction, and a side surface that faces in a second direction orthogonal to the first direction; covering the side surface in the second direction with a side margin having a lower boron concentration than a boron concentration of the ceramic layers to form an unsintered ceramic body; and sintering the unsintered ceramic body.

In the configuration described above, the boron concentration of the side margin is lower than the boron concentration of the ceramic layers. The boron is diffused from the ceramic layers to the side margin by sintering the unsintered ceramic body, and the boron concentration of the ceramic layers on the side of the side margin is lowered. Thus, the ceramics and the side margin that have low boron concentrations are disposed in the vicinity of the end portions of the internal electrodes in the second direction (superficial portion). This can inhibit the internal electrodes disposed in the superficial portion from being spheroidized or segmented by over-sintering and also allows densification of the ceramic layers at the center portion in the second direction, thus allowing sintering at low temperature. Therefore, by the method described above, it is possible to produce a multi-layer ceramic electronic component having a large capacitance, in which the occurrence of a short circuit failure or an IR failure between the internal electrodes is reduced.

The ceramic layers and the side margin may include a ceramic material as a main component, the ceramic material having a Perovskite structure as a main phase, the Perovskite structure being expressed by a general expression $ABO_3$. When a concentration of a B-site element of the ceramic material is 100 atm %, the boron concentration of the ceramic layers may be 0.05 atm % or more and 1.50 atm % or less, and the boron concentration of the side margin may be equal to or lower than 50% of the boron concentration of the ceramic layers.

With the configuration described above, it is possible to densify the ceramic layers and further suppress over-sintering of the superficial portion. This allows sintering at low temperature for a ceramic electronic component and further reduction in IR failure rate.

As described above, according to the present disclosure, it is possible to provide a multi-layer ceramic electronic component including a dense ceramic layer, in which over-sintering is suppressed, and a method of producing a multi-layer ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

I First Embodiment

1. Overall Configuration of Multi-Layer Ceramic Capacitor 10

Figure 1:
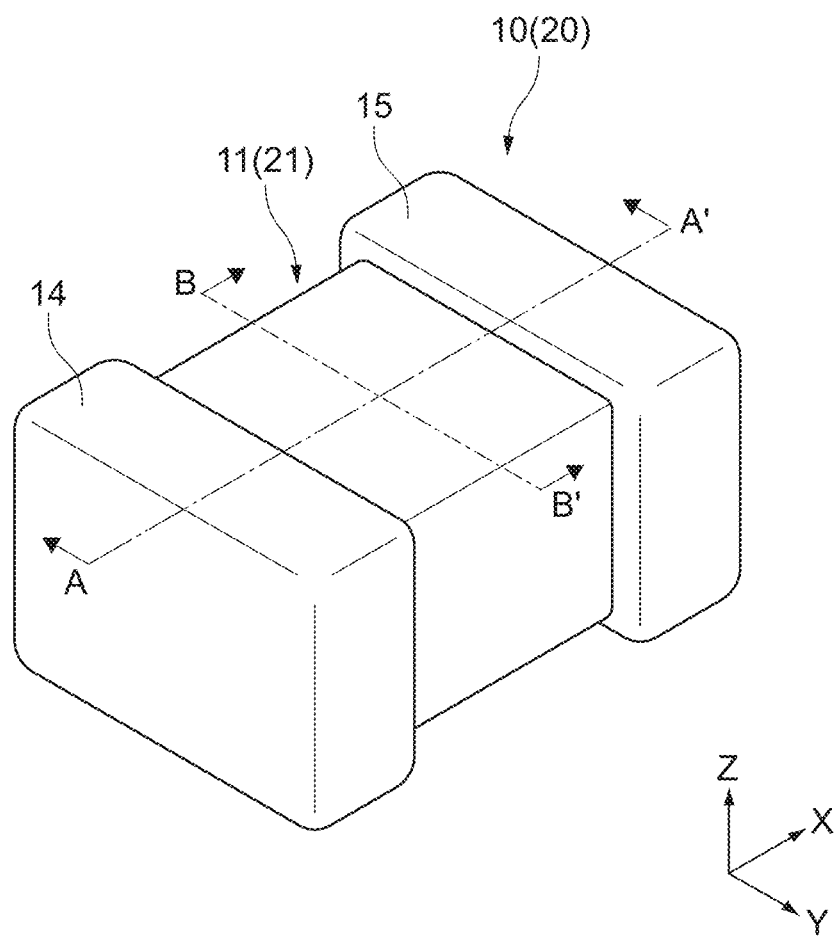
FIG. 1 is a perspective view of a multi-layer ceramic capacitor according to a first embodiment of the present disclosure.
Figure 2:
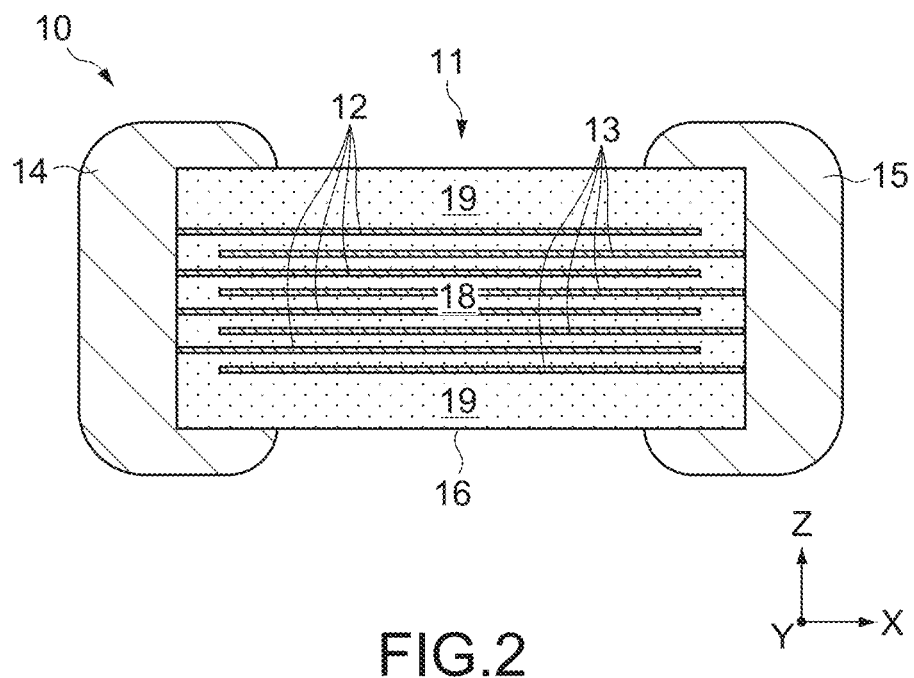
FIG. 2 is a cross-sectional view of the multi-layer ceramic capacitor taken along the A-A' line in FIG. 1.
Figure 3:
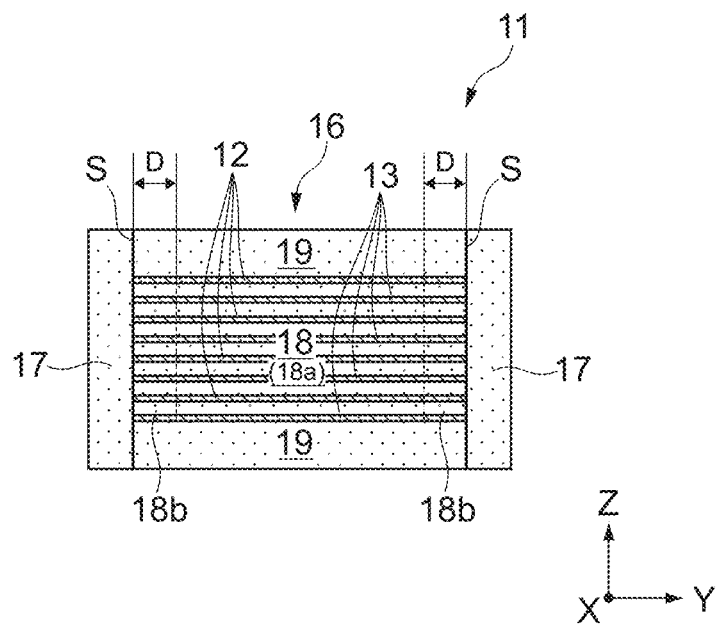
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present disclosure. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1. It should be noted that FIG. 1 also shows a multi-layer ceramic capacitor 20 according to a second embodiment of the present disclosure.

The multi-layer ceramic capacitor 10 includes a ceramic body 11, a first external electrode 14, and a second external electrode 15. Typically, the ceramic body 11 has two end surfaces facing in the X-axis direction, two side surfaces facing in the Y-axis direction, and two main surfaces facing in the Z-axis direction. It should be noted that the shape of the ceramic body 11 is not limited to such a shape. For example, the surfaces of the ceramic body 11 may be curved surfaces, and the ceramic body 11 may be rounded as a whole.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane. It should be noted that the shapes of the first external electrode 14 and the second external electrode 15 are not limited to those shown in FIG. 1.

The first and second external electrodes 14 and 15 are each made of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is made of dielectric ceramics and includes a multi-layer unit 16 and side margins 17. The multi-layer unit 16 has two end surfaces facing in the X-axis direction, two side surfaces S facing in the Y-axis direction, and two main surfaces facing in the Z-axis direction. The multi-layer unit 16 has a configuration in which a plurality of flat plate-like ceramic layers extending along the X-Y plane are laminated in the Z-axis direction. The side margins 17 are formed on both the side surfaces S of the multi-layer unit 16.

The multi-layer unit 16 includes a capacitance forming unit 18 and covers 19. The capacitance forming unit 18 includes a plurality of first internal electrodes 12 and a plurality of second internal electrodes 13, which are covered with dielectric ceramics. The capacitance forming unit 18 is covered with the covers 19 vertically in the Z-axis direction. Further, the capacitance forming unit 18 includes a first region 18a disposed at the center portion in the Y-axis direction and second regions 18b each disposed between the first region 18a and the side margin 17. It should be noted that detailed configurations of the capacitance forming unit 18 and the side margin 17 will be described later in the section of "Detailed Configurations of Capacitance Forming Unit 18 and Side Margin 17".

The first and second internal electrodes 12 and 13 each have a sheet-like shape extending along the X-Y plane and are alternately disposed along the Z-axis direction. In other words, the first internal electrode 12 and the second internal electrode 13 face each other in the Z-axis direction while sandwiching the ceramic layer therebetween. The first internal electrodes 12 are drawn to one of the end surfaces of the ceramic body 11 and connected to the first external electrode 14. The second internal electrodes 13 are drawn to the other end surface of the ceramic body 11 and connected to the second external electrode 15.

The ceramic layers between the first internal electrodes 12 on the one end surface side function as an end margin for ensuring the insulation properties between the second internal electrodes 13 and the first external electrode 14. Similarly, the ceramic layers between the second internal electrodes 13 on the other end surface side function as an end margin for ensuring the insulation properties between the first internal electrodes 12 and the second external electrode 15.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. Thus, the multi-layer ceramic capacitor 10 stores charge corresponding to the voltage applied between the first external electrode 14 and the second external electrode 15.

Further, in the capacitance forming unit 18, the surfaces excluding both the end surfaces, which face in the X-axis direction and to which the first external electrode 14 and the second external electrode 15 are provided, are covered with the side margins 17 and the covers 19. Therefore, in the capacitance forming unit 18, the side margins 17 and the covers 19 protect the periphery of the capacitance forming unit 18 and ensure insulation properties of the first internal electrodes 12 and the second internal electrodes 13.

In the ceramic body 11, in order to increase capacitances of the ceramic layers provided between the first internal electrodes 12 and the second internal electrodes 13, dielectric ceramics having a high dielectric constant is used as the main component. In this embodiment, it is favorable that dielectric ceramics having a Perovskite structure expressed by a general expression $ABO_3$ is used as a main component. For the dielectric ceramics having a high dielectric constant, for example, a material having a Perovskite structure containing barium (Ba) and titanium (Ti), which is typified by barium titanate ($BaTiO_3$), is used.

It should be noted that the main component of the ceramic layer may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

Further, the ceramic layer contains boron (B) as an accessory component in addition to the main component described above. In addition, the ceramic layer may contain vanadium (V), manganese (Mn), magnesium (Mg), silicon (Si), lithium (Li), sodium (Na), potassium (K), a rare-earth element (yttrium (Y), europium (Eu), gadolinium (Gd), terbium (Tb), dysprosium (Dy), holmium (Ho), erbium (Er), or ytterbium (Yb)), or the like as an accessory component, and the kind thereof is not limited to those above.

For the side margin 17, dielectric ceramics similar to that of the ceramic layer is used as its main component. The concentration of boron contained in the side margin 17 is lower than the concentration of boron contained in the ceramic layer and may be 0%. It should be noted that the side margin 17 may contain each accessory component described above other than boron, as in the case with the ceramic layer.

The first and second internal electrodes 12 and 13 are each made of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the multi-layer ceramic capacitor 10 according to this embodiment only needs to include the multi-layer unit 16 and the side margins 17, and other configurations of the multi-layer ceramic capacitor 10 can be changed as appropriate. For example, the number of first and second internal electrodes 12 and 13 can be determined as appropriate according to the size and performance expected for the multi-layer ceramic capacitor 10.

2. Detailed Configurations of Capacitance Forming Unit 18 and Side Margin 17

As shown in FIG. 3, in the multi-layer ceramic capacitor 10, the capacitance forming unit 18 can be divided into the first region 18a and the second regions 18b. The first region 18a is disposed at the center portion of the capacitance forming unit 18 in the Y-axis direction. Each of the second regions 18b is disposed between the first region 18a and one of the side margins 17 disposed on both sides of the capacitance forming unit 18 in the Y-axis direction.

The boron concentration of the ceramic layers disposed in the first region 18a is higher than the boron concentration of the ceramic layers disposed in the second region 18b. Further, the boron concentration of the ceramic layers disposed in the second region 18b is lower than the boron concentration of the ceramic layers disposed in the first region 18a and is higher than the boron concentration of the side margin 17. In other words, the boron concentrations of the ceramic members in those three regions become lower from the center portion of the ceramic body 11 in the Y-axis direction toward the outside thereof. Further, the side margin 17 may not contain boron.

With this configuration, the densification of the ceramic layers disposed in the first region 18a is promoted by boron. Therefore, the multi-layer ceramic capacitor 10 obtains an optimal high-temperature accelerated life and allows sintering at low temperature.

On the other hand, in the ceramic layers disposed in the second region 18b and the side margin 17, sintering is less likely to progress due to the low boron concentrations thereof. This can suppress over-sintering of the superficial portion and can inhibit the end portions of the first and second internal electrodes 12 and 13 in the Y-axis direction from being spheroidized or segmented. Therefore, in the multi-layer ceramic capacitor 10, the occurrence of a short circuit failure or an insulation resistance (IR) failure between the first and second internal electrodes 12 and 13 is reduced.

Further, the ceramic layers disposed in the second region 18b may have such a concentration gradient that the boron concentration gradually decreases from the first region 18a side toward the side margin 17 side. With this configuration, a region in which over-sintering is to be suppressed can be limited particularly to a portion of the superficial portion, in which over-sintering is likely to occur. Further, with this configuration, a ceramic-densification-promoting effect of boron can be obtained also in the second region 18b on the first region 18a side.

Further, as shown in FIG. 3, a dimension D of the width of the ceramic layers in the Y-axis direction, which are disposed between the first and second internal electrodes 12 and 13 in the second region 18b, is favorably set to, for example, 1 μm or more, and is favorably set to be equal to or smaller than 20% of the dimension of the ceramic body 11 in the Y-axis direction. When the dimension D is set to 1 μm or more, over-sintering of the superficial portion can be further suppressed. Further, when the dimension D is set to be equal to or smaller than 20% of the dimension of the ceramic body 11 in the Y-axis direction, the intersectional area can be ensured, and a large capacitance can be obtained.

3. Method of Producing Multi-layer Ceramic Capacitor 10

Figure 4:
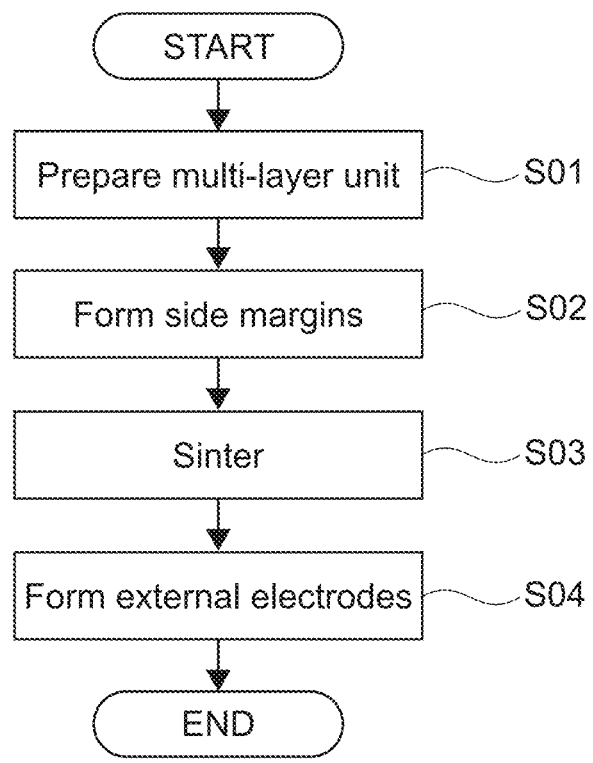
FIG. 4 is a flowchart showing a method of producing the multi-layer ceramic capacitor.

FIG. 4 is a flowchart showing a method of producing the multi-layer ceramic capacitor 10. FIGS. 5 to 11 are views each showing a production process of the multi-layer ceramic capacitor 10. Hereinafter, the method of producing the multi-layer ceramic capacitor 10 will be described according to FIG. 4 with reference to FIGS. 5 to 11 as appropriate.

3.1 Step S01: Preparation of Multi-layer Unit

Figure 5:
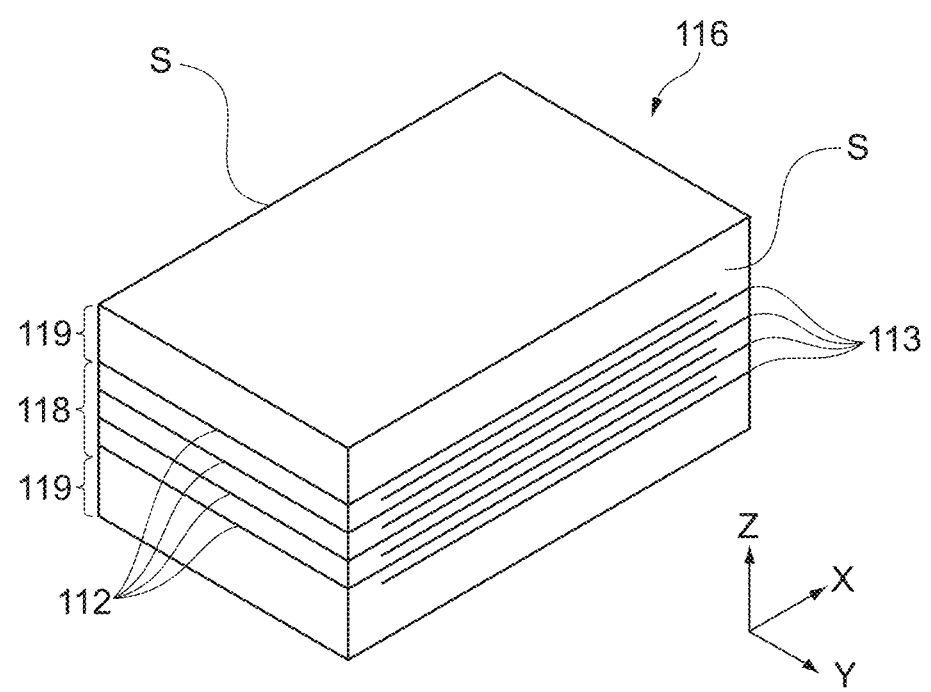
FIG. 5 is a perspective view showing a production process of the multi-layer ceramic capacitor.

In Step S01, a multi-layer unit 116 shown in FIG. 5 is prepared. The multi-layer unit 116 includes a plurality of unsintered dielectric green sheets that contain boron and are laminated. Internal electrodes 112 and 113 are patterned on the unsintered dielectric green sheets as appropriate. With this configuration, an unsintered capacitance forming unit 118 and unsintered covers 119 are formed in the multi-layer unit 116. The unsintered capacitance forming unit 118 includes a plurality of unsintered ceramic layers that contain boron and are disposed between the internal electrodes 112 and 113.

3.2 Step S02: Formation of Side Margins

In Step S02, unsintered side margins 117 are provided to the side surfaces S of the multi-layer unit 116 produced in Step S01, to produce an unsintered ceramic body 111. Hereinafter, description will be given on an example of a method of providing the unsintered side margins 117 to the side surfaces S of the multi-layer unit 116.

Figure 6:
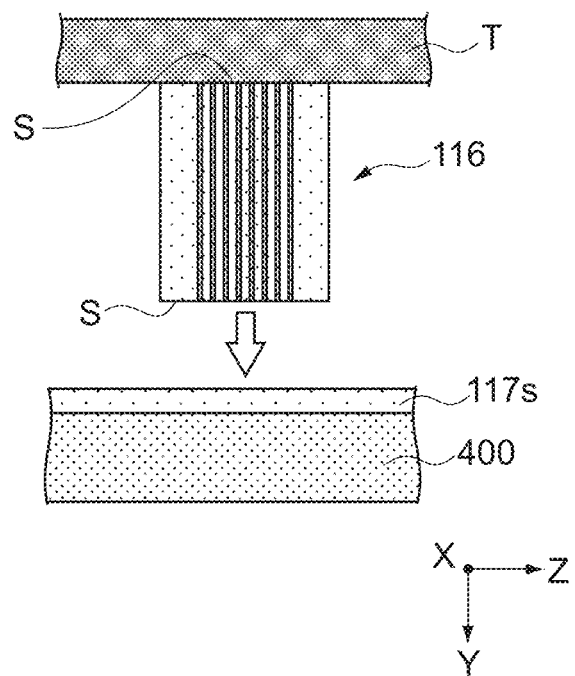
FIG. 6 is a schematic view showing a production process of the multi-layer ceramic capacitor.

First, as shown in FIG. 6, a side margin sheet 117s containing boron is disposed on a flat plate-like elastic body 400, and one side surface S of the multi-layer unit 116, the other side surface S of which is held with a tape T, is caused to face the side margin sheet 117s. The boron concentration of the side margin sheet 117s is lower than that of the unsintered ceramic layers disposed between the internal electrodes 112 and 113 of the multi-layer unit 116. Further, the side margin sheet 117s is formed as a large-sized dielectric green sheet for forming the unsintered side margins 117.

The thickness of the side margin 17 in the Y-axis direction of the multi-layer ceramic capacitor 10 shown in FIGS. 2 and 3 is adjustable by the thickness of the side margin sheet 117s. The side margin sheet 117s is formed into a sheet by using, for example, a roll coater or a doctor blade, and the thickness thereof can thus be accurately controlled.

Figure 7:
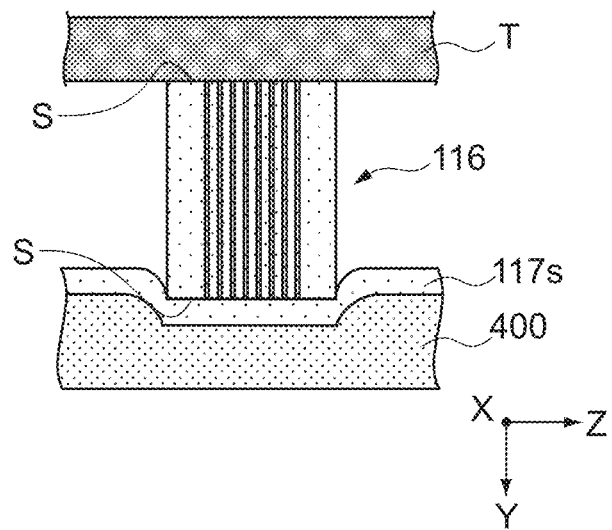
FIG. 7 is a schematic view showing a production process of the multi-layer ceramic capacitor.

Next, as shown in FIG. 7, the side surface S of the multi-layer unit 116 is pressed against the side margin sheet 117s and the multi-layer unit 116 is caused to sink into the elastic body 400 together with the side margin sheet 117s. At that time, only a region of the side margin sheet 117s, which is pressed by the multi-layer unit 116, is cut off by a shear force applied from the elastic body 400.

Figure 8:
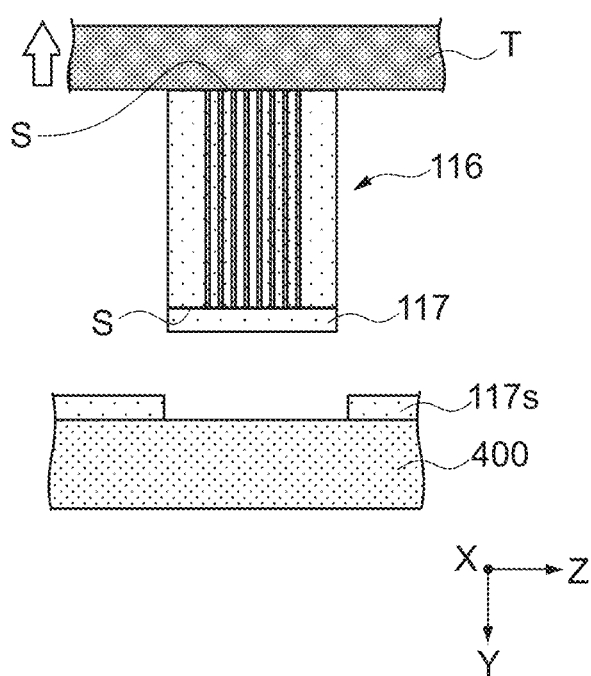
FIG. 8 is a schematic view showing a production process of the multi-layer ceramic capacitor.

When the multi-layer unit 116 is moved so as to separate from the elastic body 400 as shown in FIG. 8, only the part of the side margin sheet 117s, which is attached to the side surface S of the multi-layer unit 116, separates from the elastic body 400. Thus, the side margin 117 is formed on the side surface S of the multi-layer unit 116.

Subsequently, the orientation of the multi-layer unit 116 in the Y-axis direction is inverted by transferring the multi-layer unit 116 shown in FIG. 8 to a different tape T. In the manner similar to the above, the side margin 117 is formed also on the side surface S on the other side of the multi-layer unit 116, on which the side margin 117 is not formed.

Figure 9:
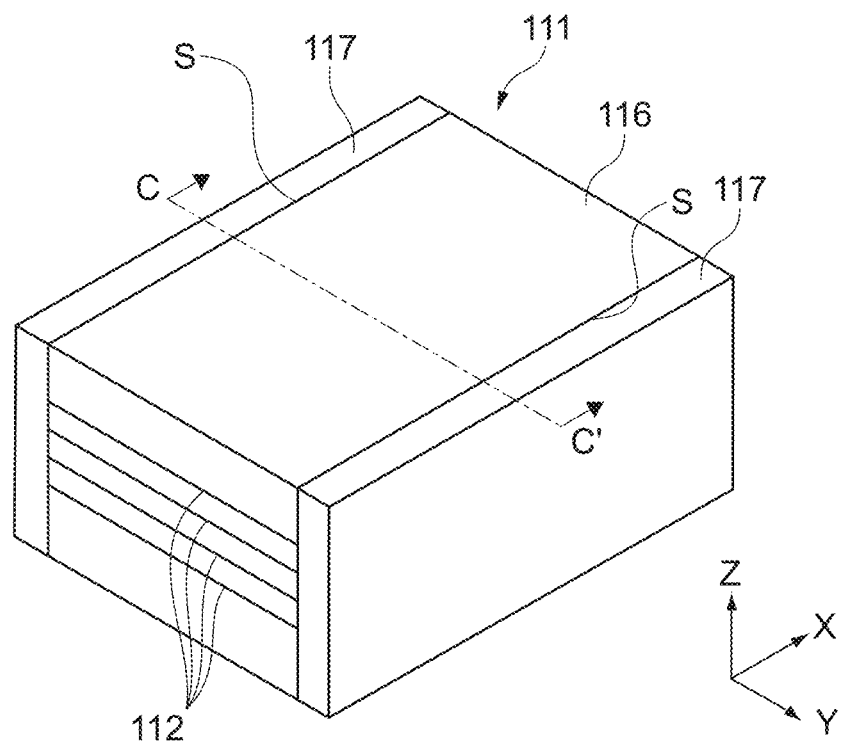
FIG. 9 is a perspective view showing a production process of the multi-layer ceramic capacitor.

With this configuration, as shown in FIG. 9, the unsintered ceramic body 111 in which the side margins 117 are formed on both the side surfaces S of the multi-layer unit 116 is obtained. The side margin 117 has a boron concentration that is lower than that of the unsintered ceramic layers disposed between the internal electrodes 112 and 113 of the multi-layer unit 116. In the unsintered ceramic body 111, the side surfaces S of the multi-layer unit 116, from which the internal electrodes 112 and 113 are exposed, are covered with the side margins 117.

In this embodiment, the main component of the ceramic layers disposed in the capacitance forming unit 118 and the side margin 117 is a ceramic material having a Perovskite structure as a main phase, the Perovskite structure being expressed by a general expression $ABO_3$. Assuming that the concentration of a B-site element of the main component is 100 atm %, it is favorable that the boron concentration of the ceramic layers is 0.05 atm % or more and 1.50 atm % or less, and the boron concentration of the side margin 117 is set to be equal to or lower than 50% of the boron concentration of the ceramic layers. At that time, the side margins 117 may not contain boron. When such conditions are satisfied, it is possible to achieve the densification of the ceramic layers and further suppress over-sintering of the superficial portion. Accordingly, it is possible to perform sintering at low temperature for the multi-layer ceramic capacitor 10 and further reduce an IR failure rate.

It should be noted that the method of forming the side margins 117 on the side surfaces S of the multi-layer unit 116 is not limited to the above method of punching the side margin sheet 117s. For example, the side margin sheets 117s previously cut may be attached to the side surfaces S of the multi-layer unit 116 to form the side margins 117.

Alternatively, the method of forming the side margins 117 on the side surfaces S of the multi-layer unit 116 may be a dip method, in which each side surface S of the multi-layer unit 116 is immersed into ceramic slurry and then pulled up. Thus, the ceramic slurry adheres to the side surface S of the multi-layer unit 116, thus forming the side margin 117.

3.3 Step S03: Sintering

In Step S03, the unsintered ceramic body 111 obtained in Step S02 is sintered to produce the ceramic body 11 of the multi-layer ceramic capacitor 10 shown in FIGS. 1 to 3. In other words, in Step S03, the multi-layer unit 116 becomes the multi-layer unit 16, and the side margins 117 become the side margins 17.

Figure 10:
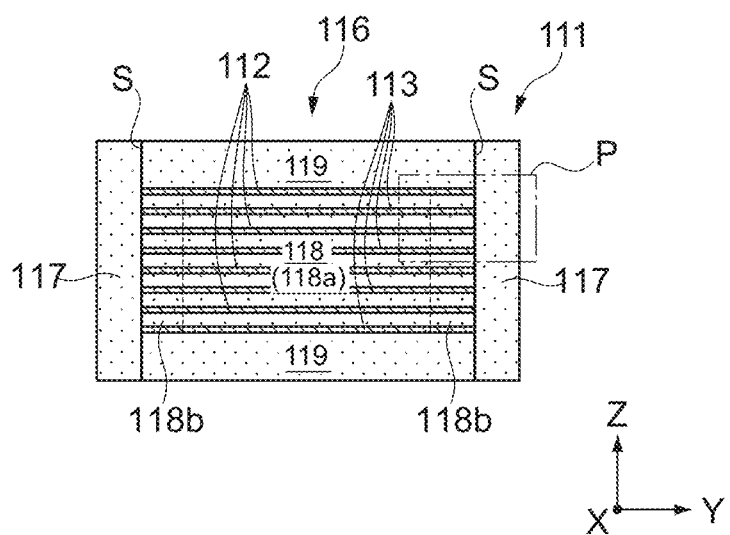
FIG. 10 is a view showing a production process of the multi-layer ceramic capacitor and is also a cross-sectional view of the multi-layer ceramic capacitor taken along the C-C' line in FIG. 9.
Figure 11:
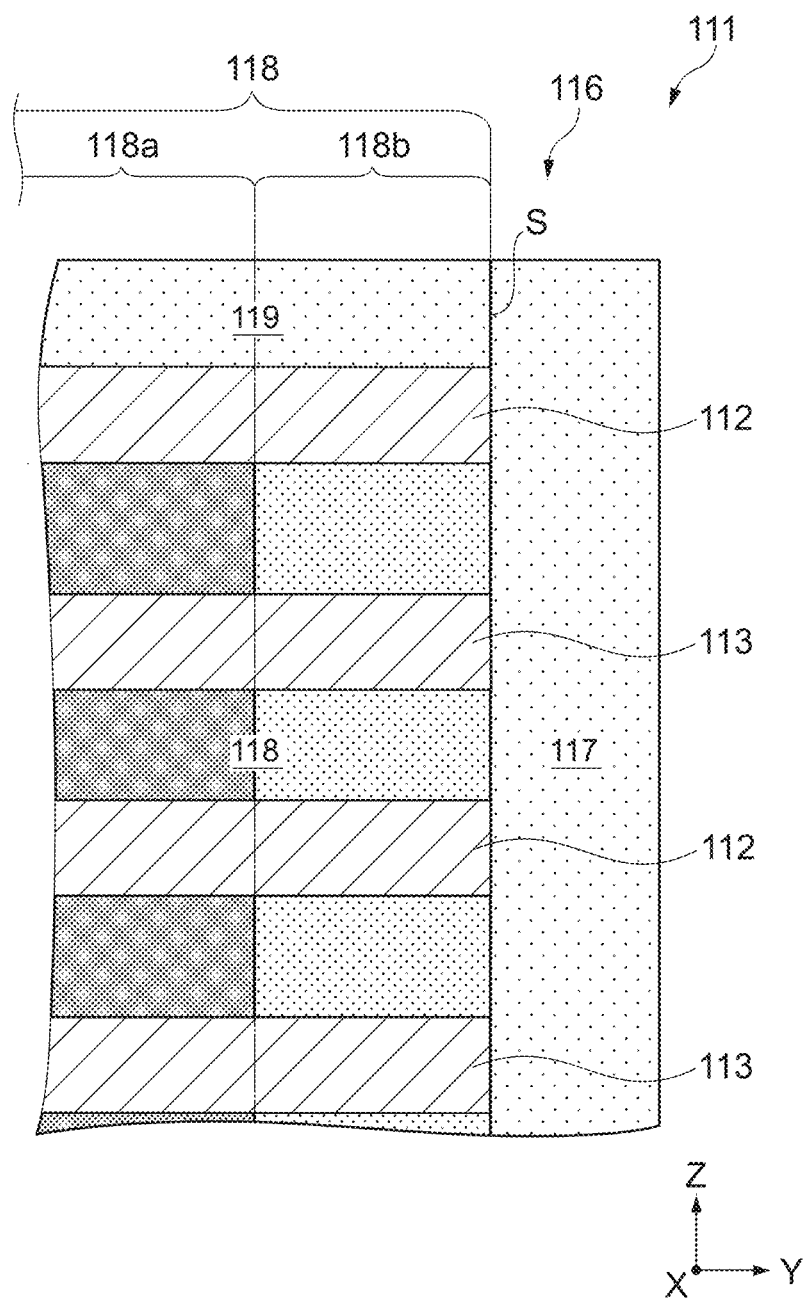
FIG. 11 is a view showing a production process of the multi-layer ceramic capacitor and is also an enlarged cross-sectional view of a region P in FIG. 10.

FIG. 10 is a cross-sectional view of the unsintered ceramic body 111 taken along the C-C' line in FIG. 9. FIG. 10 also shows a first region 118a during sintering and second regions 118b during sintering, together with the capacitance forming unit 118. So, FIG. 10 is also a cross-sectional view of the unsintered ceramic body 111 during sintering. Further, FIG. 11 is an enlarged cross-sectional view of a region P in FIG. 10.

In the capacitance forming unit 118, the first region 118a and the second regions 118b are formed during sintering as described above. This is because boron contained in the ceramic layers disposed in the capacitance forming unit 118 is diffused by sintering to the side margin 117 having a lower boron concentration. Specifically, the first region 118a having a higher boron concentration is formed at the center portion of the capacitance forming unit 118 in the Y-axis direction, and the second region 118b having a lower boron concentration than that of the first region 118a and having a higher boron concentration than that of the side margin 117 is formed between the first region 118a and the side margin 117.

In such a manner, in this production method, the boron concentration is changed by sintering at the center portion of the unsintered ceramic body 111 in the Y-axis direction and the outer side portion thereof in the Y-axis direction, so that the following problem is solved.

As described above, it is known that when boron is added to dielectric ceramics, the densification of ceramics is promoted at sintering, which enables sintering at low temperature. Further, in general, when an unsintered ceramic body is sintered in the production of a multi-layer ceramic capacitor, the superficial portion of the unsintered ceramic body is exposed to high temperature for a longer time than the center portion. For that reason, the superficial portion of the unsintered ceramic body may be over-sintered. In other words, in the ceramic body to which boron is added, the following disadvantage occurs: the ceramics at the center portion is densified by boron, but the ceramics in the superficial portion is likely to be over-sintered by boron.

When over-sintering occurs in the ceramic layers disposed between the internal electrodes, ceramic particles undergo excessive grain growth, and the internal electrodes are segmented. As a result, when the internal electrodes changed into melt are spheroidized, the vertically adjacent internal electrodes disposed in the Z-axis direction come close to each other, and the reduction in insulation properties occurs. Further, since the shape of each internal electrode is changed, the intersectional area is reduced and the electrostatic capacitance is lowered.

In this production method, as shown in FIGS. 10 and 11, the ceramic layers in the second region 118b and the side margin 117 that have low boron concentrations are disposed in the vicinity of the end portions of the internal electrodes 112 and 113 in the Y-axis direction (superficial portion). This can inhibit the internal electrodes 112 and 113 disposed in the superficial portion from being spheroidized or segmented by over-sintering and also promote densification of the ceramic layers in the first region 118a because of a high boron concentration thereof, thus allowing sintering at low temperature. Therefore, it is possible to produce the multi-layer ceramic capacitor 10 having a large capacitance, in which the occurrence of a short circuit failure or an IR failure between the first and second internal electrodes 12 and 13 is reduced.

A sintering temperature in Step S03 can be determined on the basis of a sintering temperature for the ceramic body 111. In this embodiment, since the ceramic layers disposed in the capacitance forming unit 118 contain boron, the boron promotes the densification of the ceramic layers. Thus, for example, when a barium titanate (BaTiO$_3$) based material is used, the sintering temperature can be set to a low temperature, approximately 1,000 to 1,200° C. Further, sintering can be performed in a reduction atmosphere or a low-oxygen partial pressure atmosphere, for example.

3.4 Step S04: Formation of External Electrodes

In Step S04, the first external electrode 14 and the second external electrode 15 are formed at both the end portions of the ceramic body 11 in the X-axis direction obtained in Step S03, to produce the multi-layer ceramic capacitor 10 shown in FIGS. 1 to 3. A method of forming the first external electrode 14 and the second external electrode 15 in Step S04 is optionally selectable from publicly known methods.

Further, the first external electrode 14 and the second external electrode 15 may be sintered simultaneously with the unsintered ceramic body 111. In other words, after Step S02, unsintered external electrodes can be formed at both the end portions of the unsintered ceramic body 111 in the X-axis direction and then sintered simultaneously with the unsintered ceramic body 111 in Step S03, to form the first external electrode 14 and the second external electrode 15.

The multi-layer ceramic capacitor 10 is produced by the production method described above.

4. Examples 4.1 Production of Multi-layer Ceramic Capacitor 10

For Examples of the first embodiment, 1,000 samples were produced in each of Examples 1 to 12 by using the production method described above. Further, for Comparative examples, 1,000 samples of the multi-layer ceramic capacitors 10 according to each of Comparative examples 1 to 7 were produced by using the production method described above.

In each sample described above, the dimension in the X-axis direction was set to 1,100 μm, the dimension in the Y-axis direction was set to 600 μm, and the dimension in the Z-axis direction was set to 600 μm. Further, a temperature at which the side margin 17 has a porosity of 5% or lower after sintering was selected from the range of 1,000 to 1,200° C. as a sintering temperature. Here, the porosity is defined as a ratio of the area of pores in a captured image of the cross section of the side margin 17.

The samples are different between Examples 1 to 12 and Comparative examples 1 to 7 in boron additive concentration of the unsintered ceramic layers disposed in the capacitance forming unit 118 prepared in Step S01 (preparation of multi-layer unit). In addition thereto, the samples are different between Examples 1 to 12 and Comparative examples 1 to 7 in boron additive concentration of the side margin 117 formed in Step S02 (formation of side margins).

While other configurations and production conditions were common in Examples and Comparative examples described above, the main component of the ceramic material used in the unsintered ceramic layers, the side margins 117, and the covers 119 was barium titanate (BaTiO$_3$). Hereinafter, the boron additive concentration of the ceramic layer and the side margin 117 is set to be a boron additive concentration [atm %] obtained when titanium (Ti) contained in barium titanate (BaTiO$_3$), which is the main component of the ceramic layer and the side margin 117, is assumed to have 100 atm %.

Specifically, the boron additive concentrations [atm %] of the ceramic layer in the samples were 0.050 atm %, 0.050 atm %, 0.100 atm %, 0.100 atm %, 0.500 atm %, 0.500 atm %, 1.000 atm %, 1.000 atm %, 1.500 atm %, 1.500 atm %, 2.000 atm %, and 2.000 atm % in Examples 1 to 12, respectively, and 0.000 atm %, 0.05 atm %, 0.100 atm %, 0.500 atm %, 1.000 atm %, 1.500 atm %, and 2.000 atm % in Comparative examples 1 to 7, respectively.

Further, specifically, the boron additive concentrations [atm %] of the side margin 117 in the samples were 0.000 atm %, 0.025 atm %, 0.000 atm %, 0.050 atm %, 0.000 atm %, 0.200 atm %, 0.000 atm %, 0.500 atm %, 0.000 atm %, 1.000 atm %, 0.000 atm %, and 1.000 atm % in Examples 1 to 12, respectively, and 0.000 atm %, 0.050 atm %, 0.100 atm %, 0.500 atm %, 1.000 atm %, 1.500 atm %, and 2.000 atm % in Comparative examples 1 to 7, respectively.

4.2 Measurement of Boron Concentration Distribution by LA-ICP-MS

Next, in order to confirm that the boron concentration distribution of the produced multi-layer ceramic capacitor 10 coincides with the boron concentration distribution described in the first embodiment, the boron concentration distribution of the ceramic body 11 of the multi-layer ceramic capacitor 10 along the Y-axis direction was measured by laser ablation inductively coupled plasma (ICP) mass spectrometry (LA-ICP-MS).

The samples of Example 3 were used for the measurement of the boron concentration distribution. First, the ceramic body 11 of each sample of Example 3 was cut along the Y-Z plane, and a measurement sample whose cut surface faces to the front (X-axis direction) was produced.

Figure 12:
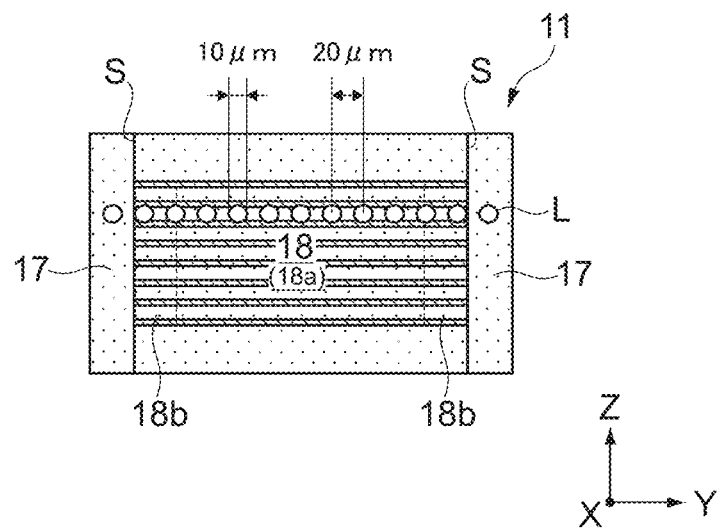
FIG. 12 is a cross-sectional view of the multi-layer ceramic capacitor according to the first embodiment of the present disclosure, which shows a laser irradiation method by an LA-ICP-MS.

Next, as shown in FIG. 12, the cut surface of the measurement sample was spot-irradiated with a laser beam a plurality of times, to generate a plurality of irradiation spots L. Subsequently, the elemental composition of microparticles volatilized from the irradiation spots L was analyzed by LA-ICP-MS.

For the laser beam irradiation method, the ceramic body 11 was spot-irradiated at a plurality of sites along the Y-axis direction across the side margin 17 on one side-surface side of the ceramic body 11, the ceramic layer of the second region 18b on the one side-surface side of the ceramic body 11, the ceramic layer of the first region 18a, the ceramic layer of the second region 18b on the other side-surface side of the ceramic body 11, and the side margin 17 on the other side-surface side of the ceramic body 11. Thus, the irradiation spots L each having a diameter of 10 μm and a spot interval of 20 μm were generated.

For the laser beam irradiation conditions, energy was set to 11 to 12 J/cm$^2$, a frequency was set to 10 Hz, and a laser irradiation time was set to 15 seconds for each of the irradiation spots L.

Figure 13:
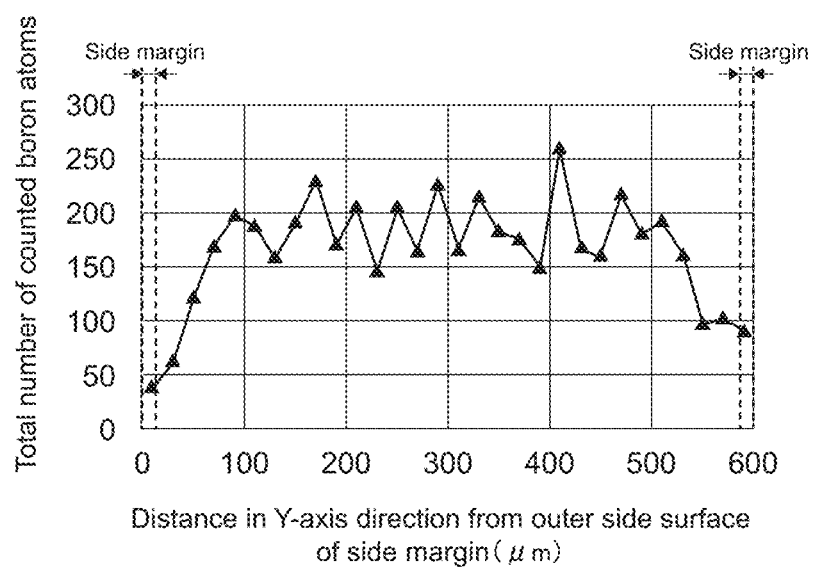
FIG. 13 is a graph showing boron concentrations of a ceramic layer and a side margin of the multi-layer ceramic capacitor in a Y-axis direction.

FIG. 13 is a graph showing a relationship between the number of boron atoms counted from microparticles volatilized from each irradiation spot L (vertical axis) and a distance in the Y-axis direction of the ceramic body 11 (horizontal axis). In other words, FIG. 13 is a graph showing a boron concentration distribution of the ceramic body 11 of the multi-layer ceramic capacitor 10 along the Y-axis direction.

It is found from FIG. 13 that the number of boron atoms is small in the side margins 17 on both the side surfaces and becomes larger toward the inside of the capacitance forming unit 18 in the Y-axis direction. The number of boron atoms gradually increases in a region of approximately 50 μm from the side surface S, in which the number of boron atoms is larger than that in the side margin 17 and is smaller than that in a region from approximately 50 μm to approximately 550 μm at the center portion in the Y-axis direction. Thus, it was confirmed that the region of approximately 50 μm is the second region 18b. The number of boron atoms is stably approximately 200 in the region from approximately 50 μm to approximately 550 μm at the center portion in the Y-axis direction, and it was confirmed that the region from approximately 50 μm to approximately 550 μm is the first region 18a.

From above, it was confirmed that the boron concentration distribution along the Y-axis direction of the ceramic body 11 of the multi-layer ceramic capacitor 10 actually produced coincides with the boron concentration distribution described in the first embodiment.

It should be noted that for a method of counting the boron atoms in the microparticles volatilized from each irradiation spot L, a method of counting boron-11 ($^{11}$B), which makes up approximately 80% of natural boron, by LA-ICP-MS, and then calculating the number of boron atoms including all the isotopes naturally occurring was used.

4.3 Evaluation of High-temperature Accelerated Life and Insulation Resistance of Multi-layer Ceramic Capacitor 10

High-temperature accelerated life and insulation resistance were evaluated for each of the samples of the multi-layer ceramic capacitors 10 according to Examples 1 to 12 and Comparative examples 1 to 7. Specifically, for the evaluation of the high-temperature accelerated life in each of Examples 1 to 12, 50 samples were held at a temperature of 150° C. under application of a voltage of 50 V/μm for 100 minutes. When the failure rate reached 50% after the elapse of 100 minutes or more, those samples were evaluated as "A". When the failure rate reached 50% before the elapse of 100 minutes, those samples were evaluated as "C". It should be noted that the sample evaluated as "A" has a favorable quality as a product. Meanwhile, the sample evaluated as "C" has a poor quality and is not to be used as a product.

Further, specifically, the insulation resistance was evaluated for 1,000 samples of each of Examples 1 to 12 and Comparative examples 1 to 7. A DC voltage of 4V was applied to the samples. When an occurrence rate of the samples having a resistivity of 1 MΩ or less (IR failure rate) was less than 0.5%, those samples were evaluated as "A". When the occurrence rate was 0.5% or more and less than 1.0%, those samples were evaluated as "B". When the occurrence rate was 1.0% or more, those samples were evaluated as "C". It should be noted that the sample evaluated as "B" has a favorable quality as a product. The sample evaluated as "A" has a more favorable quality as a product. Meanwhile, the sample evaluated as "C" has a poor quality and is not to be used as a product.

Table 1 shows the boron additive concentration [atm %] of the ceramic layer, which is represented as (X), the boron additive concentration [atm %] of the side margin 117, which is represented as (Y), and a boron additive concentration ratio of the side margin 117 to the ceramic layer, which is represented as an inner-outer B-concentration ratio Y/X, in the samples of the multi-layer ceramic capacitors 10 in each of Examples and Comparative examples.

TABLE 1

|  | B additive concentration[atm %] | | Inner-outer B-concentration ratio | High-temperature | IR failure |
| --- | --- | --- | --- | --- | --- |
|  | Ceramic layer(X) | Side margin(Y) | Y/X | accelerated life | rate |
| Example 1 | 0.050 | 0.000 | 0.0 | A | A |
| Example 2 | 0.050 | 0.025 | 0.5 | A | A |
| Example 3 | 0.100 | 0.000 | 0.0 | A | A |
| Example 4 | 0.100 | 0.050 | 0.5 | A | A |
| Example 5 | 0.500 | 0.000 | 0.0 | A | A |
| Example 6 | 0.500 | 0.200 | 0.4 | A | A |
| Example 7 | 1.000 | 0.000 | 0.0 | A | A |
| Example 8 | 1.000 | 0.500 | 0.5 | A | A |
| Example 9 | 1.500 | 0.000 | 0.0 | A | A |
| Example 10 | 1.500 | 1.000 | 0.7 | A | B |
| Example 11 | 2.000 | 0.000 | 0.0 | A | B |
| Example 12 | 2.000 | 1.000 | 0.5 | A | B |
| Comparative example 1 | 0.000 | 0.000 | — | C | — |
| Comparative example 2 | 0.050 | 0.050 | 1.0 | A | C |
| Comparative example 3 | 0.100 | 0.100 | 1.0 | A | C |
| Comparative example 4 | 0.500 | 0.500 | 1.0 | A | C |
| Comparative example 5 | 1.000 | 1.000 | 1.0 | A | C |
| Comparative example 6 | 1.500 | 1.500 | 1.0 | A | C |
| Comparative example 7 | 2.000 | 2.000 | 1.0 | A | C |

In Table 1, the high-temperature accelerated life was evaluated as "C" for the samples of Comparative example 1 in which the boron additive concentrations [atm %] of the ceramic layer and the side margin 117 are 0.000%. A cause of the high-temperature accelerated life reduced in such a manner is thought as follows: since the ceramic layer does not contain boron, the sintering of the ceramic layer is delayed, and the densification is insufficient. In the other Examples and Comparative examples, the ceramic layers contained boron and were thus densified, so that the high-temperature accelerated life was evaluated as "A". In such a manner, it was confirmed that providing boron to the ceramic layers promotes the densification of ceramics at low temperature and enables the improvement in high-temperature accelerated life.

Next, in each of Examples 1 to 12, the samples had a low IR failure rate and were evaluated as "A" or "B". This results from a higher boron additive concentration of the ceramic layer than the boron additive concentration of the side margin 117. When the boron additive concentration is changed in such a manner, as described above, the ceramic layers in the first region 18a have a high boron concentration and are thus densified. Additionally, in the vicinity of the end portions of the first and second internal electrodes 12 and 13 in the Y-axis direction, the ceramic layers in the second region 18b, in which boron is diffused to the side margin 17 and the concentration of boron is reduced, suppress the delay of sintering of the ceramic layers and also suppress over-sintering thereof. Thus, it was confirmed that a short circuit or reduction in insulation properties, which are caused when the end portions of the first and second internal electrodes 12 and 13 in the Y-axis direction are spheroidized or segmented, can be inhibited from occurring.

Furthermore, in each of Examples 1 to 9, the samples had a significantly low IR failure rate and were evaluated as "A". In Examples 1 to 9, the boron additive concentration of the ceramic layer is 0.050 atm % or more and 1.500 atm % or less, and the inner-outer B-concentration ratio Y/X is in the range of 0.0 to 0.5 (i.e., the boron additive concentration of the side margin 117 is equal to or lower than 50% of the boron additive concentration of the ceramic layer). It was confirmed that when those conditions are satisfied, the ceramic layer can be densified and the IR failure rate can be further reduced.

Meanwhile, in each of Comparative examples 2 to 7, the samples had a high IR failure rate and were evaluated as "C". In Comparative examples 2 to 7, the boron additive concentration of the ceramic layer and the boron additive concentration of the side margin 117 are equal to each other, and the inner-outer B-concentration ratio Y/X is 1.0. In such a manner, when the boron additive concentration of the side margin 117 is close to or equal to the boron additive concentration of the ceramic layer, the densification of the ceramic layers is accomplished. However, the boron concentration becomes high also in the vicinity of the end portions of the first and second internal electrodes 12 and 13 in the Y-axis direction, and thus over-sintering occurs. Accordingly, a short circuit or reduction in insulation properties occurs when the end portions of the first and second internal electrodes 12 and 13 in the Y-axis direction are spheroidized or segmented, resulting in a high IR failure rate of the samples.

II Second Embodiment

1. Configuration of Multi-layer Ceramic Capacitor 20

Figure 14:
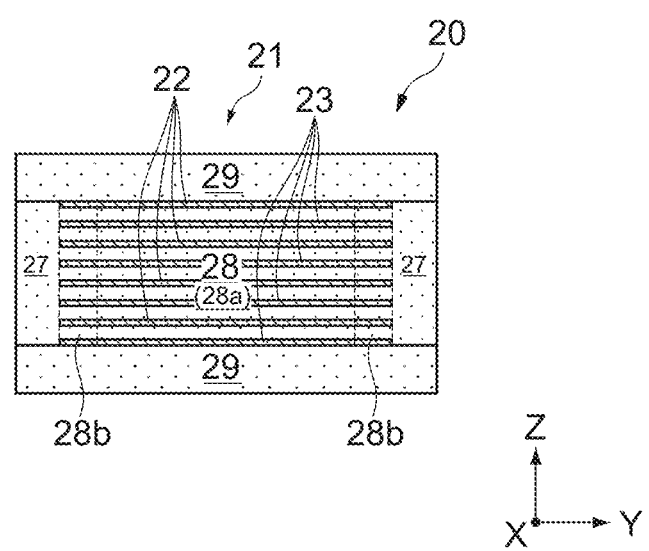
FIG. 14 is a cross-sectional view of a multi-layer ceramic capacitor according to a second embodiment of the present disclosure.

FIG. 1 is a perspective view of a multi-layer ceramic capacitor 20 according to a second embodiment. FIG. 14 is a cross-sectional view of the multi-layer ceramic capacitor 20 taken along the B-B' line in FIG. 1. Hereinafter, a difference between the multi-layer ceramic capacitors 10 and 20 will be described, and description on similar configurations will be omitted as appropriate.

The multi-layer ceramic capacitor 20 includes a ceramic body 21, a first external electrode 14, and a second external electrode 15. The ceramic body 21 is made of dielectric ceramics and includes side margins 27, a capacitance forming unit 28, and covers 29.

The capacitance forming unit 28 is made of dielectric ceramics and includes first internal electrodes 22 and second internal electrodes 23 that are alternately disposed along the Z-axis direction. Further, the capacitance forming unit 28 includes a first region 28a and second regions 28b. The first region 28a is disposed at the center portion in the Y-axis direction. The second region 28b is disposed between the first region 28a and each of the side margins 27. The first region 28a and the second region 28b correspond to the first region 18a and the second region 18b in the first embodiment, respectively.

The side margins 27 are formed on both the side surfaces of the capacitance forming unit 28 in the Y-axis direction. The side margins 27 have a substantially uniform boron concentration and correspond to the side margins 17 in the first embodiment.

The covers 29 are different from the covers 19 in the first embodiment. The covers 29 cover the side margins 27 and the capacitance forming unit 28 vertically in the Z-axis direction.

The first region 28a, the second regions 28b, and the side margins 27 correspond to the respective regions and members in the first embodiment as described above and provide configurations and actions/effects similar to those in the first embodiment.

2. Method of Producing Multi-layer Ceramic Capacitor 20

The method of producing the multi-layer ceramic capacitor 20 is different from the method of producing the multi-layer ceramic capacitor 10 in Step S01, does not include Step S02, and includes steps subsequent to Step S02, which are common with the method of producing the multi-layer ceramic capacitor 10. Therefore, in the method of producing the multi-layer ceramic capacitor 20 according to this embodiment, preparation of an unsintered ceramic body, sintering thereof, and formation of external electrodes are performed in this order. Hereinafter, the preparation of an unsintered ceramic body as the first step will be described, and description on the subsequent steps will be omitted as appropriate.

Figure 15:
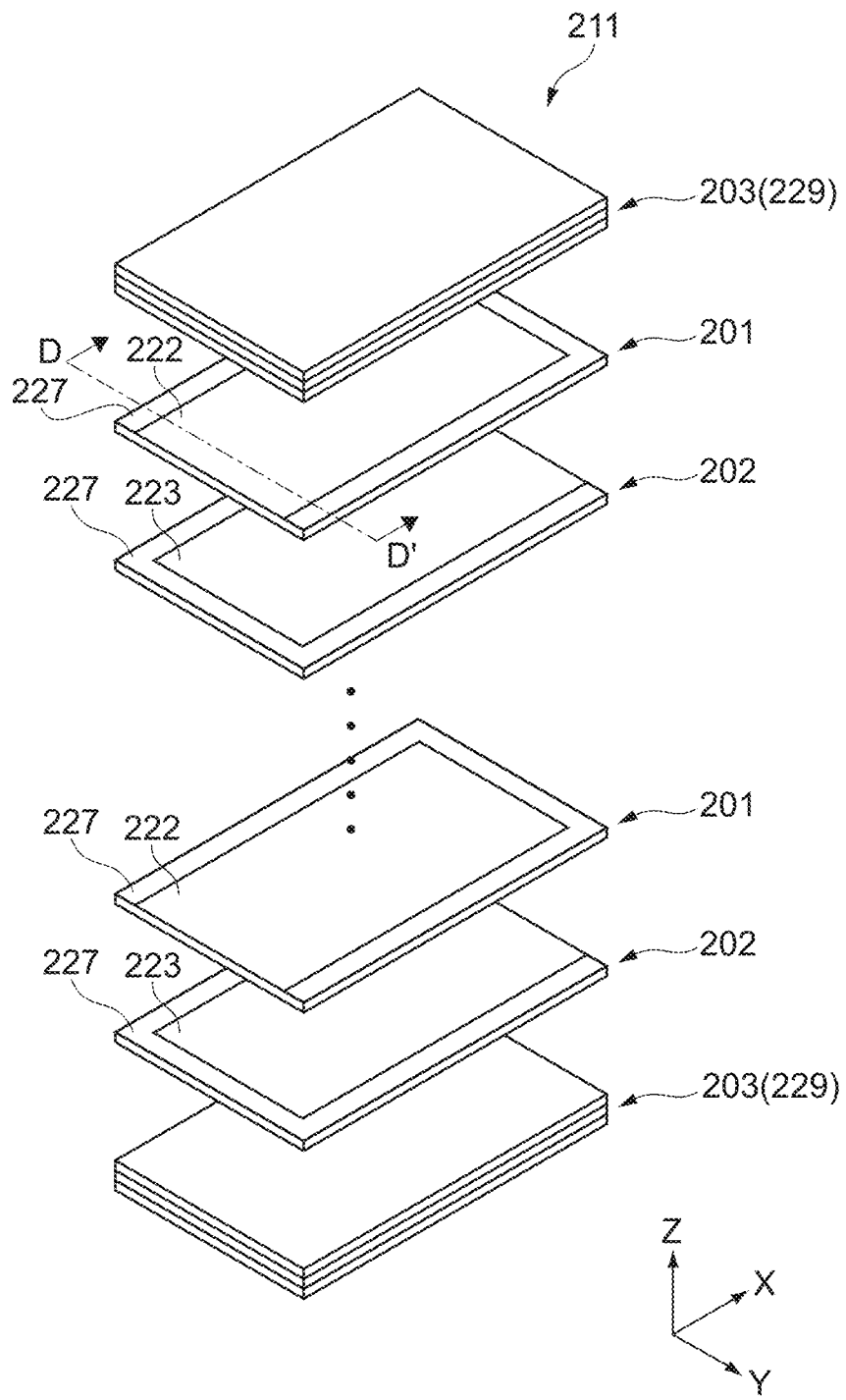
FIG. 15 is an exploded perspective view showing a production process of the multi-layer ceramic capacitor.

In the step of preparing an unsintered ceramic body, an unsintered ceramic body 211 is prepared. FIG. 15 is an exploded perspective view of the unsintered ceramic body 211. In FIG. 15, the unsintered ceramic body 211 is divided into ceramic sheets for convenience of explanation. However, in the actual unsintered ceramic body 211, the ceramic sheets are integrated.

In the unsintered ceramic body 211, a plurality of first ceramic sheets 201 and a plurality of second ceramic sheets 202, which are unsintered, are laminated at the center portion in the Z-axis direction. Each of the first ceramic sheets 201 includes a ceramic layer containing boron, on which an internal electrode 222 and a buffer layer 227 are patterned as appropriate. Each of the second ceramic sheets 202 includes a ceramic layer containing boron, on which an internal electrode 223 and a buffer layer 227 are patterned as appropriate. As the outermost layers, third ceramic sheets 203 corresponding to unsintered covers 229 (covers 29) are laminated on the first and second ceramic sheets 201 and 202 laminated vertically in the Z-axis direction. The internal electrodes 222 each drawn to one end surface side in the X-axis direction and the internal electrodes 223 each drawn to the other end surface side in the X-axis direction are alternately disposed in the Z-axis direction. It is favorable that the buffer layer 227 does not contain boron, but it may contain boron at a lower concentration than that of the ceramic layers disposed on the first ceramic sheets 201 and the second ceramic sheets 202 (hereinafter, referred to simply as ceramic layers).

The unsintered ceramic body 211 laminated as described above has a structure in which the buffer layers 227, the first ceramic sheets 201, and the second ceramic sheets 202 are alternately laminated in the Z-axis direction in the outer side portions in the Y-axis direction. The boron in the ceramic layers is diffused by sintering to the buffer layers 227 containing no boron or containing boron at a low concentration. Accordingly, this laminated structure becomes the side margin 27 having a substantially uniform boron concentration.

Figure 16:
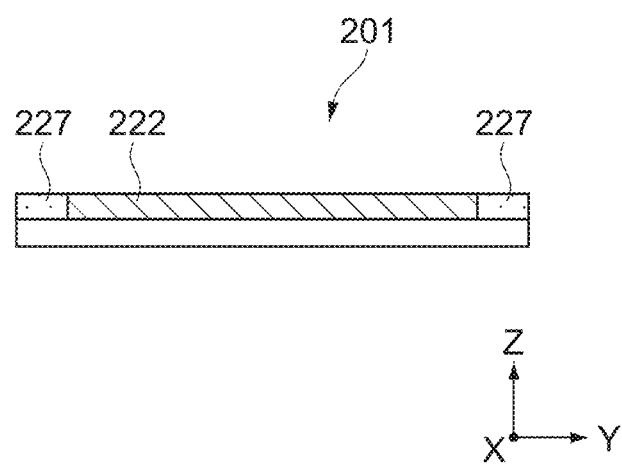
FIG. 16 is a view showing a production process of the multi-layer ceramic capacitor and is also a cross-sectional view of the multi-layer ceramic capacitor taken along the D-D' line in FIG. 15.

FIG. 16 is a cross-sectional view of the first ceramic sheet 201 taken along the D-D' line in FIG. 15. In this embodiment, as shown in FIG. 16, a thickness dimension of the ceramic layer and a thickness dimension of the buffer layer 227 formed on the ceramic layer are equal to each other. Thus, the boron concentration of the side margin 27 is a mean value of the boron concentration of the buffer layer 227 and the boron concentration of the ceramic layer. Typically, the thickness dimension of the buffer layer 227 and the thickness dimension of the ceramic layer can be set to be the same dimension, but the present disclosure is not limited thereto.

Further, at the center portion in the Y-axis direction, the unsintered ceramic body 211 has a structure in which the internal electrodes 222 and 223 and the first and second ceramic sheets 201 and 202 are alternately laminated in the Z-axis direction. This laminated structure becomes the capacitance forming unit 28 by sintering.

In the capacitance forming unit 28, the boron in the ceramic layers in the vicinity of the outer side portions in the Y-axis direction is diffused to the side margins 27 by sintering and thus the concentration thereof becomes lower than that of the ceramic layers in the vicinity of the center portion in the Y-axis direction. Accordingly, the capacitance forming unit 28 is divided into the first region 28a and the second regions 28b. The first region 28a is disposed at the center portion in the Z-axis direction. The second region 28b is disposed between the first region 28a and the side margin 27 and has a lower boron concentration than that of the ceramic layers in the first region 28a. The ceramic sheets 203, i.e., the unsintered covers 229 become the covers 29 by sintering.

It should be noted that the first ceramic sheets 201 and the second ceramic sheets 202 are laminated one by one in the example of FIG. 15, but the number of first ceramic sheets 201 and the number of second ceramic sheets 202 can be changed as appropriate. Similarly, the three third ceramic sheets 203 are laminated on each of the top and the bottom of the laminate including the first ceramic sheets 201 and the second ceramic sheets 202, but the number of third ceramic sheets 203 can be changed as appropriate.

3. Examples

3.1 Production of Multi-Layer Ceramic Capacitor 20

For Examples of the second embodiment, 1,000 samples according to each of Examples 13 to 15 were produced by the production method described above. Further, for Comparative examples, 1,000 samples of the multi-layer ceramic capacitors 20 according to each of Comparative examples 8 to 11 were produced by the production method described above.

In each sample described above, the dimension in the X-axis direction was 1,100 μm, the dimension in the Y-axis direction was 600 µm, and the dimension in the Z-axis direction was 600 µm. Further, the thickness dimension of each of the buffer layer 227 and the ceramic layer was 1 µm. Further, a temperature at which the side margin 27 has a porosity of 5% or lower after sintering was selected from the range of 1,000 to 1,200° C. as a sintering temperature.

ceramic capacitors 20 in each of Examples and Comparative examples. Further, Table 2 shows a boron-concentration mean value [atm %] of the side margin 27, which is represented as (Y'), and a boron concentration ratio of the side margin 27 to the ceramic layer, which is represented as an inner-outer B-concentration ratio Y'/X.

TABLE 2

|  | B additive concentration[atm %] | | B-concentration mean value of side margin (Y')[atm %] | Inner-outer B-concentration ratio Y'/X | High-temperature accelerated life | IR failure rate |
|---|---|---|---|---|---|---|
|  | Ceramic layer (X) | Buffer layer (Y) |  |  |  |  |
| Example13 | 0.050 | 0.000 | 0.025 | 0 50 | A | A |
| Example14 | 1.500 | 0.000 | 0.750 | 0.50 | A | A |
| Example15 | 2.000 | 0.000 | 1.000 | 0.50 | A | B |
| Comparative example8 | 0.000 | 0.000 | 0.000 | — | C | — |
| Comparative example9 | 0.050 | 0.050 | 0.050 | 1.00 | A | C |
| Comparative example10 | 1.500 | 1.500 | 1.500 | 1.00 | A | C |
| Comparative example11 | 2.000 | 2.000 | 2.000 | 1.00 | A | C |

The samples are different between Examples 13 to 15 and Comparative examples 8 to 11 in boron additive concentration of the ceramic layers disposed in the plurality of first ceramic sheets 201 and the plurality of second ceramic sheets 202, which are unsintered and disposed in the unsintered ceramic body 211 prepared in the first step (preparation of unsintered ceramic body). In addition thereto, the samples are different between Examples 13 to 15 and Comparative examples 8 to 11 in boron additive concentration of the buffer layers 227 disposed in the unsintered ceramic body 211 in the step described above.

While other configurations and production conditions are common in Examples and Comparative examples described above, the main component of the ceramic material used in the unsintered ceramic layers, the buffer layers 227, and the covers 229 was barium titanate ($BaTiO_3$). Hereinafter, the boron additive concentration of the ceramic layer and the buffer layer 227 is set to a boron additive concentration [atm %] obtained when titanium (Ti) contained in barium titanate ($BaTiO_3$), which is the main component of the ceramic layer and the buffer layer 227, is assumed to have 100 atm %.

Specifically, the boron additive concentrations [atm %] of the ceramic layer in the samples were 0.050 atm %, 1.500 atm %, and 2.000 atm % in Examples 13 to 15, respectively, and 0.000 atm %, 0.050 atm %, 1.500 atm %, and 2.000 atm % in Comparative examples 8 to 11, respectively.

Further, specifically, the boron additive concentrations [atm %] of the buffer layer 227 in the samples were 0.000 atm % in all of Examples 13 to 15, and 0.000 atm %, 0.050 atm %, 1.500 atm %, and 2.000 atm % in Comparative examples 8 to 11, respectively.

3.2 Evaluation of High-temperature Accelerated Life and Insulation Resistance of Multi-layer Ceramic Capacitor 20

High-temperature accelerated life and insulation resistance were evaluated for each of the samples of the multi-layer ceramic capacitors 20 according to Examples 13 to 15 and Comparative examples 8 to 11. The high-temperature accelerated life and the insulation resistance were evaluated by using the conditions and evaluation method that are similar to those in Examples 1 to 12 and Comparative examples 1 to 7 described above.

Table 2 shows the boron additive concentration [atm %] of the ceramic layer, which is represented as (X), and the boron additive concentration [atm %] of the buffer layer 227, which is represented as (Y), in the samples of the multi-layer In Table 2, the high-temperature accelerated life was evaluated as "C" for the samples of Comparative example 8 in which the boron additive concentrations [atm %] of the ceramic layer and the buffer layer 227 are 0.000% for the reason described above. The high-temperature accelerated life was evaluated as "A" for the samples of the other Examples and Comparative examples.

Next, in each of Examples 13 to 15, the samples had a low IR failure rate and were evaluated as "A" or "B". This results from a higher boron additive concentration of the ceramic layer than the boron-concentration mean value of the side margin 27. When the boron additive concentration is changed in such a manner, as described above, the ceramic layers in the first region 28a and the second regions 28b have a high boron concentration and are thus densified. Additionally, in the vicinity of the end portions of the internal electrodes 22 and 23 in the Y-axis direction, the boron is diffused and the concentration of boron is reduced, which suppresses the delay of sintering of the ceramic layers and also suppresses over-sintering thereof. Thus, it was confirmed that a short circuit or reduction in insulation properties, which are caused when the end portions of the internal electrodes 22 and 23 in the Y-axis direction are spheroidized or segmented, can be inhibited from occurring.

Furthermore, in each of Examples 13 and 14, the samples had a significantly low IR failure rate and were evaluated as "A". In Examples 13 and 14, the boron additive concentration of the ceramic layer is 0.050 atm % or more and 1.500 atm % or less, and the inner-outer B-concentration ratio Y'/X is in the range of 0.0 to 0.5 (i.e., the boron-concentration mean value of the side margin 27 is equal to or lower than 50% of the boron additive concentration of the ceramic layer). It was confirmed that when those conditions are satisfied, the ceramic layers can be densified and the IR failure rate can be further reduced.

Meanwhile, in each of Comparative examples 8 to 11, the samples had a high IR failure rate and were evaluated as "C". In Comparative examples 8 to 11, the boron additive concentration of the ceramic layer and the boron-concentration mean value of the side margin 27 are equal to each other, and the inner-outer B-concentration ratio Y'/X is 1.0. In such a manner, when the boron-concentration mean value of the side margin 27 is close to or equal to the boron additive concentration of the ceramic layer, the densification of the ceramic layers is accomplished. However, the boron concentration becomes high also in the vicinity of the end portions of the first and second internal electrodes 22 and 23 in the Y-axis direction, and thus over-sintering occurs. Accordingly, a short circuit or reduction in insulation properties occurs when the end portions of the first and second internal electrodes 22 and 23 in the Y-axis direction are spheroidized or segmented, resulting in a high IR failure rate of the samples.

As described above, it is considered that the side margin 27 of the multi-layer ceramic capacitor 20 according to the second embodiment has a substantially uniform boron-concentration mean value (Y') [atm %] because the boron in the ceramic layers of the ceramic sheets 201 and 202 is diffused by sintering. In other words, it is considered that the side margin 27 is a region having a structure equal to that of the side margin 17.

Therefore, it was confirmed from Examples described above that the multi-layer ceramic capacitor 20 according to the second embodiment also provides an action/effect similar to that of the multi-layer ceramic capacitor 10 according to the first embodiment.

III Other Embodiments

While the embodiments of the present disclosure have been described, the present disclosure is not limited to the embodiments described above, and it should be appreciated that the present disclosure may be variously modified as a matter of course.

Further, in the embodiments described above, the multi-layer ceramic capacitors 10 and 20 have been described as an example of a multi-layer ceramic electronic component, but the present disclosure can be applied to general multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising
   a multi-layer unit including
      a capacitance forming unit including
         ceramic layers that are laminated in a first direction and contain boron, and
         internal electrodes disposed between the ceramic layers,
      a cover that covers the capacitance forming unit in the first direction, and
      a side surface that faces in a second direction orthogonal to the first direction; and
   a side margin that covers the side surface in the second direction,
   wherein the ceramic layers include dielectric ceramics having a Perovskite structure as a main component and further include boron,
   wherein the side margin includes a dielectric ceramic having a Perovskite structure as a main component and further includes boron, and
   wherein the side margin has a lower boron concentration than a boron concentration of the ceramic layers.

2. The multi-layer ceramic electronic component according to claim 1, wherein
   the capacitance forming unit includes
      a first region disposed at the center portion in the second direction, and
      a second region that is disposed between the first region and the side margin, the boron concentration of the ceramic layers in the second region being lower than the boron concentration of the ceramic layers in the first region and higher than the boron concentration of the side margin.

3. The multi-layer ceramic electronic component according to claim 2, wherein
   the ceramic layers disposed in the second region has the boron concentration gradually decreasing from a side of the first region toward a side of the side margin.

4. The multi-layer ceramic electronic component according to claim 2, wherein a dimension of the second region in the second direction is 1 μm or more and is equal to or smaller than 20% of the dimension, in the second direction, of a ceramic body that comprises the multi-layer unit and a pair of side margins.

5. The multi-layer ceramic electronic component according to claim 1, wherein the dielectric ceramics of the ceramic layers and of the side margin comprise at least one of strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material.

6. The multi-layer ceramic electronic component according to claim 5, wherein the ceramic layers and the side margin have a common main component.

* * * * *